US012604178B2

(12) United States Patent
Fan

(10) Patent No.: US 12,604,178 B2
(45) Date of Patent: Apr. 14, 2026

(54) METHOD FOR MULTI-CARD TERMINAL DEVICE COOPERATIVE COMMUNICATION AND ELECTRONIC DEVICE

(71) Applicant: GUANGDONG OPPO MOBILE TELECOMMUNICATIONS CORP., LTD., Dongguan (CN)

(72) Inventor: Jiangsheng Fan, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 290 days.

(21) Appl. No.: 18/487,370

(22) Filed: Oct. 16, 2023

(65) Prior Publication Data

US 2024/0040364 A1 Feb. 1, 2024

Related U.S. Application Data

(63) Continuation of application No. PCT/CN2021/088784, filed on Apr. 21, 2021.

(51) Int. Cl.
*H04W 88/02* (2009.01)
*H04W 8/18* (2009.01)
*H04W 68/00* (2009.01)
*H04W 88/06* (2009.01)

(52) U.S. Cl.
CPC ......... *H04W 8/183* (2013.01); *H04W 68/005* (2013.01); *H04W 88/06* (2013.01)

(58) Field of Classification Search
CPC ... H04W 8/183; H04W 68/00; H04W 68/005; H04W 68/02; H04W 88/06; Y02D 30/70

USPC .......................................................... 455/418
See application file for complete search history.

(56) References Cited

U.S. PATENT DOCUMENTS

| | | | |
|---|---|---|---|
| 2018/0368101 A1 | 12/2018 | Agiwal et al. | |
| 2021/0092706 A1* | 3/2021 | Ozturk ................... | H04W 76/11 |
| 2022/0141800 A1* | 5/2022 | Chen ..................... | H04W 68/00 |
| | | | 370/329 |

(Continued)

FOREIGN PATENT DOCUMENTS

| | | |
|---|---|---|
| CN | 110677900 | 1/2020 |
| CN | 111149377 | 5/2020 |
| CN | 111698741 | 9/2020 |

(Continued)

OTHER PUBLICATIONS

IP.com search history (Year: 2025).*

(Continued)

*Primary Examiner* — Moustapha Diaby
(74) *Attorney, Agent, or Firm* — Hodgson Russ LLP

(57) ABSTRACT

A method for multiple-card (multi-card) terminal device cooperative communication is applicable to a terminal device. The terminal device includes a first SIM-card set and a second SIM-card set, and at least one first SIM card in the first SIM-card set and at least one second SIM card in the second SIM-card set have a capability related to cooperative paging and/or cooperative operation. The method includes the following. The at least one first SIM card in the first SIM-card set transmits to the at least one second SIM-card in the second SIM-card set paging-related data corresponding to the at least one second SIM-card in the second SIM-card set in response to reception of the paging-related data.

16 Claims, 7 Drawing Sheets

(56)            References Cited

U.S. PATENT DOCUMENTS

| | | | |
|---|---|---|---|
| 2022/0256497 A1* | 8/2022 | Hong | H04W 76/15 |
| 2022/0272522 A1* | 8/2022 | Hong | H04W 68/005 |

FOREIGN PATENT DOCUMENTS

| | | |
|---|---|---|
| CN | 112166634 | 1/2021 |
| EP | 4007422 A1 | 6/2022 |
| WO | 2020256489 | 12/2020 |
| WO | 2021008381 | 1/2021 |
| WO | 2021026877 | 2/2021 |
| WO | 2021034175 A1 | 2/2021 |

OTHER PUBLICATIONS

"3rd Generation Partnership Project; Technical Specification Group Radio Access Network; NR; Radio Resource Control (RRC) protocol specification (Release 16)," 3GPP TS 38.331, Jan. 2021, v16.3.1.

"3rd Generation Partnership Project; Technical Specification Group Radio Access Network; NR; User Equipment (UE) procedures in Idle mode and RRC Inactive state (Release 16)," 3GPP TS 38.304, Dec. 2020, v16.3.0.

WIPO, International Search Report and Written Opinion for International Application No. PCT/CN2021/088784, Dec. 7, 2021.

VIVO(Moderator), "Report of phase 1 Multi-SIM email discussion," 3GPP TSG-RAN Wg Meeting #85, RP-191898, Newport Beach, USA, Sep. 16-20, 2019.

EPO, Extended European Search Report issued for EP Application No. 21937319.8, Apr. 30, 2024.

* cited by examiner (a)

(b)

(c)

METHOD FOR MULTI-CARD TERMINAL DEVICE COOPERATIVE COMMUNICATION AND ELECTRONIC DEVICE

CROSS-REFERENCE TO RELATED APPLICATION(S)

This application is a continuation of International Application No. PCT/CN2021/088784, filed Apr. 21, 2021, the entire disclosure of which is incorporated herein by reference.

TECHNICAL FIELD

This disclosure relates to the field of communication technology, and in particular, to methods and apparatuses for multiple-card (multi-card) terminal device cooperative communication.

BACKGROUND

Multiple-card (multi-card) terminal device communication generally refers to a situation in which the same terminal device includes multiple subscriber identity module (SIM) cards capable of accessing cells independently from each other and performing terminal communication with the cells. For example, in the case of dual-card dual-standby, two SIM cards of different operator networks or the same operator network can be inserted into one mobile phone and are in a standby state at the same time, and a user can dial/answer a call or receive/transmit a short message at will without switching a network.

A terminal device including multiple SIM cards generally does not support a pure dual uplink or downlink (Dual UL/DL), where Dual UL/DL means that the terminal device performs UL and DL data services on two networks simultaneously via two SIM cards (namely, two terminals). Most current terminal devices only support single UL/DL or single UL/Dual DL, which means that the terminal device can only perform a service via one SIM card at a certain moment.

In this case, although different SIM cards belonging to one terminal device operate independently, different SIM cards share a hardware resource of the same terminal device, for example, transmit or receive antennas. In order to enable each SIM card to receive paging, a receiving resource of the terminal device is switched back and forth between different SIM cards, thereby increasing power consumption of the terminal device.

SUMMARY

In a first aspect, a method for multi-card terminal device cooperative communication is provided in implementations of the disclosure. The method is applicable to a terminal device, where the terminal device includes a first SIM-card set and a second SIM-card set. At least one first SIM-card in the first SIM-card set and at least one second SIM-card in the second SIM-card set have a capability related to cooperative paging and/or cooperative operation. The method includes the following. The at least one first SIM-card in the first SIM-card set transmits to the at least one second SIM-card in the second SIM-card set paging-related data corresponding to the at least one second SIM-card in the second SIM-card set in response to reception of the paging-related data.

In a second aspect, a method for multi-card terminal device cooperative communication is provided in implementations of the disclosure. The method includes the following. An access network device determines a first SIM-card set and a second SIM-card set that correspond to a terminal device. At least one first SIM-card in the first SIM-card set and at least one second SIM-card in the second SIM-card set have a capability related to cooperative paging and/or cooperative operation. The access network device transmits first signaling or first communication information to the at least one first SIM-card in the first SIM-card set. The first signaling or the first communication information includes paging-related data corresponding to the at least one second SIM-card in the second SIM-card set.

In a third aspect, a method for multi-card terminal device cooperative communication is provided in implementations of the disclosure. The method includes the following. A core network device determines a first SIM-card set and a second SIM-card set that correspond to a terminal device. At least one first SIM-card in the first SIM-card set and at least one second SIM-card in the second SIM-card set have a capability related to cooperative paging and/or cooperative operation. The core network device transmits second configuration information to the terminal device. The second configuration information is used for the terminal device to determine the first SIM-card set and the second SIM-card set.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

The following will give a brief introduction to accompanying drawings required for describing implementations or the related art.

DETAILED DESCRIPTION

First, a scenario to which implementations of the disclosure are applicable is introduced.

The implementations of the disclosure may be applicable to a long term evolution (LTE) system, a new radio (NR) system, a global system for mobile communication (GSM), a universal mobile telecommunications system (UMTS), a code division multiple access (CDMA) system, a new network device system, etc.

Figure 1:
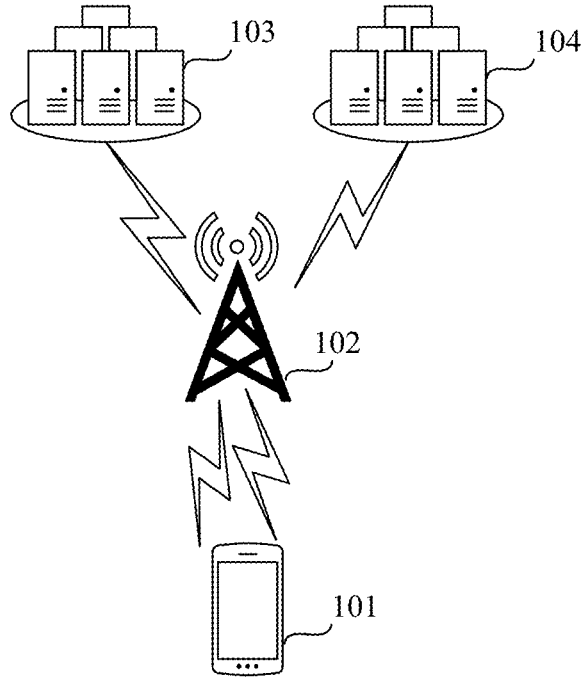
FIG. 1 is a schematic diagram of a communication system provided in implementations of the disclosure.

Referring to FIG. 1, FIG. 1 is a schematic diagram of a communication system provided in implementations of the disclosure. As illustrated in FIG. 1, the system includes a terminal device 101, and an access network device 102 and a core network device 103 that communicate with the terminal device 101. The terminal device 101 may include multiple communication cards (which may specifically be subscriber identity module (SIM) cards). Each communication card can independently access a network and complete communication, that is, each communication card can execute complete functions of a terminal device, and thus the terminal device 101 in implementations of the disclosure is a multiple-card (multi-card) terminal device. Multiple communication cards in the multi-card terminal device may communicate with the same access network device or different access network devices. Therefore, the terminal device 101 may communicate with the access network device 102, and may also communicate with the access network device 102 and other access network devices (not illustrated in the figure) simultaneously. In addition, the system may further include the core network device 103 and a core network device 104. Because multiple communication cards in the same terminal device may correspond to different operators, the terminal device 101 may be connected to different core network devices 103 and 104 via the access network device 102, and then served by different core network devices (that is, multiple communication cards in the multi-card terminal device communicate with multiple operators via the same base station). Alternatively, the terminal device 101 may be connected to multiple access network devices, and then connected to different core network devices via the multiple access network devices (that is, multiple communication cards in the multi-card terminal device communicate with multiple operators via different base stations). Alternatively, multiple communication cards in the terminal device 101 may be connected to the same access network device, and then connected to the same core network device via the access network device (that is, multiple communication cards in the multi-card terminal device communicate with one operator via the same base station).

Methods in implementations of the disclosure may be applicable to an NR system (may also be referred to as a 5$^{th}$ generation (5G) network system), and primary application scenarios are: enhanced mobile broadband (eMBB), ultra reliable low latency communications (URLC), and massive machine type communications (mMTC).

The demand for eMBB is growing rapidly with the goal of providing users with multimedia contents, services, and data. On the other hand, since eMBB may be deployed in different scenarios, such as indoor, urban, rural, and the like, the capabilities and demands vary greatly, therefore, it must be analyzed in detail in the context of specific deployment scenarios. Typical applications of URLLC include: industrial automation, power automation, remote medical operation (surgery), traffic safety and security, and the like. Typical features of mMTC include: high connection density, small data volume, delay-insensitive services, low cost and long lifetime of the module, and the like.

Other information related to implementations of the disclosure will be introduced below.

A radio resource control (RRC) connection of a terminal includes different states, for example, an idle state (RRC_IDLE) and a connection state (RRC_CONNECTED). Specifically, in the RRC_IDLE state, mobility is based on cell reselection of a terminal, paging is initiated by a core network device, and a paging area is configured by the core network device. An access network device has no UE access stratum (AS) context and no RRC connection.

In the RRC_CONNECTED state, there is an RRC connection. Both the access network device and the terminal have a UE AS context, and the access network device knows a location of the terminal based on a cell level. Mobility is controlled by the access network device. Unicast data can be transmitted between the terminal and the access network device.

In addition, in a 5G network environment, a new RRC state, namely an inactive state (RRC_INACTIVE), has been defined to reduce air interface signaling, achieve fast radio connection recovery, and achieve fast data service recovery. Such a state is different from the RRC_IDLE state and the RRC_CONNECTED state. Specifically, mobility is based on cell reselection of the terminal, there is a connection between the core network device and a radio access network (RAN), a certain base station has a UE AS context, paging is triggered by the RAN, an RAN-based paging area is managed by the RAN, and a network side knows the location of the terminal is RAN-based paging area level.

In a paging process, a terminal device monitors a paging physical downlink control channel (PDCCH) and obtains data transmitted by an access network device. In the case where the terminal device includes multiple terminals, each terminal can complete a paging process, but paging processes corresponding to different RRC states of the terminal are different.

A terminal in the RRC_IDLE state or the RRC_INACTIVE state needs to demodulate not only a paging PDCCH corresponding to a paging occasion (PO) associated with the terminal, but also a paging message carried in a physical downlink shared channel (PDSCH) that is scheduled by the paging PDCCH. A terminal in the RRC_CONNECTED state concerns only indication information indicative of system information update carried in the paging PDCCH, and paging PDCCHs corresponding to POs in a paging discontinuous reception (DRX) period include the same indication information indicative of system information update, and thus in the paging DRX period, the terminal needs to demodulate only one paging PDCCH corresponding to any PO.

Figure 2A:
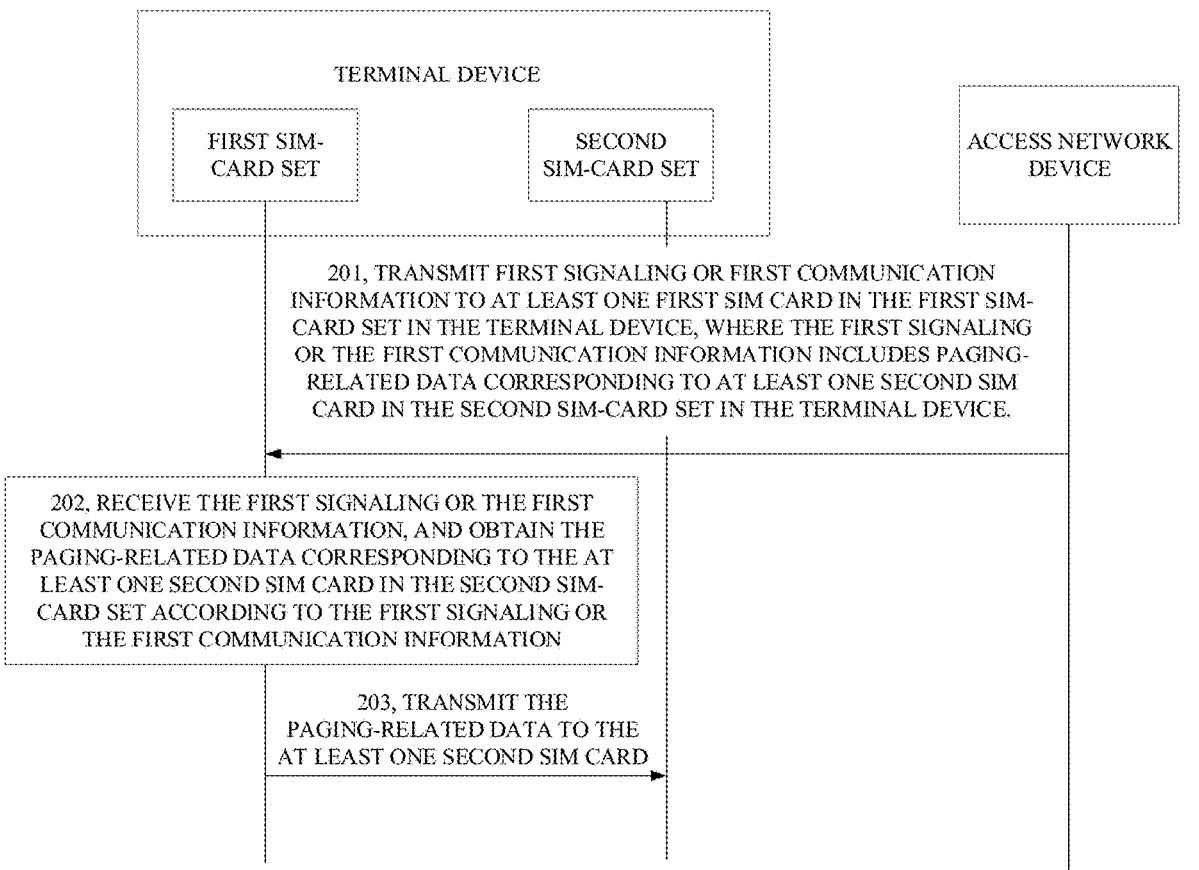
FIG. 2A is a flowchart illustrating a method for multiple-card (multi-card) terminal device cooperative communication provided in implementations of the disclosure.

Referring to FIG. 2A, FIG. 2A is a flowchart illustrating a method for multi-card terminal device cooperative communication provided in implementations of the disclosure. As illustrated in FIG. 2A, the method includes the following.

At block 201, an access network device transmits first signaling or first communication information to at least one first SIM card in a first SIM-card set in a terminal device. The first signaling or the first communication information includes paging-related data corresponding to at least one second SIM card in a second SIM-card set in the terminal device. The at least one first SIM card in the first SIM-card set and the at least one second SIM card in the second SIM-card set have a capability related to cooperative paging and/or cooperative operation.

At block 202, the at least one first SIM card in the terminal device receives the first signaling or the first communication information, and obtains the paging-related data corresponding to the at least one second SIM card in the second SIM-card set according to the first signaling or the first communication information.

At block 203, the at least one first SIM card in the terminal device transmits the paging-related data to the at least one second SIM card.

It can be seen from the foregoing description that in a paging process, the terminal device monitors a paging PDCCH and obtains downlink data transmitted by the access network device. In addition, the terminal in an RRC_IDLE state or an RRC_INACTIVE state further needs to obtain paging data carried in a PDSCH scheduled by the paging PDCCH. If the multi-card terminal device accesses a network via the same access network device, the multi-card terminal device can monitor a PDCCH via one (or some) SIM card and obtain paging-related data of the SIM card per se and/or paging-related data of another SIM card. Upon determining that a paging message is the paging-related data of the other SIM card, the paging-related data is transmitted to a processing module of the corresponding SIM card.

In implementations of the disclosure, multiple SIM cards in the terminal device are classified into a first SIM-card set and a second SIM-card set. Each SIM-card set includes one or more SIM cards, and cooperative paging or cooperative operation can be performed between an SIM card in the first SIM-card set and an SIM card in the second SIM-card set. Cooperative paging means that the SIM card in the first SIM-card set can receive paging-related data transmitted by the access network device for the SIM card in the second SIM-card set. Cooperative operation means that the SIM card in the first SIM-card set can further help the SIM card in the second SIM-card set to receive other data or signaling besides the paging-related data transmitted by the access network device. In addition, the terminal device may further include a third SIM-card set, where an SIM card in the third SIM-card set does not participate in cooperative paging or cooperative operation, but communicates with the network device independently.

In addition, the first SIM-card set may have one or more SIM cards, and the second SIM-card set may also have one or more SIM cards. During cooperative paging, a correspondence between first SIM cards in the first SIM-card set and second SIM cards in the second SIM-card set can refer to FIG. 2B. As illustrated in (a) of FIG. 2B, the first SIM cards may be in one-to-one correspondence with the second SIM cards during cooperative paging. That is to say, one first SIM card in the first SIM-card set obtains paging-related data of one second SIM card in the second SIM-card set and transmits the paging-related data to the second SIM card. Alternatively, as illustrated in (b) of FIG. 2B, the first SIM cards may be in one-to-multiple correspondence with the second SIM cards during cooperative paging. That is to say, one SIM card in the first SIM-card set obtains paging-related data of multiple second SIM cards in the second SIM-card set, and transmits the paging-related data respectively to the multiple second SIM cards in the second SIM-card set for processing. Alternatively, as illustrated in (c) of FIG. 2B, the first SIM cards may be in multiple-to-one correspondence with the second SIM cards during cooperative paging. That is to say, each of multiple first SIM cards in the first SIM-card set obtains paging-related data of a certain second SIM card in the second SIM-card set during communication with the access network device, and then transmits the paging-related data obtained to the certain second SIM card in the second SIM-card set. Similarly, the first SIM cards may also be in multiple-to-multiple correspondence with the second SIM cards during cooperative paging, which is not detailed herein.

It needs to be noted that cooperative paging or cooperative operation are not supported between the multiple SIM cards in the first SIM-card set. That is to say, each of the multiple SIM cards in the first SIM-card set can obtain its own paging-related data only through communication between the SIM card per se and the access network device, but cannot obtain the paging-related data via other SIM cards in the first SIM-card set.

The access network device may transmit the paging-related data through the first signaling or the first communication information. For example, the paging-related data is transmitted through RRC signaling or downlink control information (DCI), where the DCI includes indication information indicative of system information update and/or an indication information indicative of alarm information. Alternatively, the paging-related data is transmitted through a paging message carried in a PDSCH scheduled by paging DCI.

In implementations of the disclosure, the paging-related data refers to related data used by the access network device to indicate an SIM card for performing paging communication. Therefore, the paging-related data may include: system architecture evolution-temporary mobile subscriber identity (S-TMSI) allocated by the core network device, an inactive-radio network temporary identifier (I-RNTI) allocated by the access network device, or a cell network temporary identifier (C-RNTI) allocated by the access network device. The S-TMSI allocated by the core network device is used to uniquely identify a terminal. The I-RNTI represents identifier information allocated by the access network device to a terminal in an RRC_INACTIVE state, and is used to uniquely identify the terminal. Since one SIM card independently implements functions of one terminal, the I-RNTI, the C-RNTI, or the S-TMSI can also be used to uniquely identify one SIM card. The paging-related data transmitted by the access network device can be used to page an SIM card identified by the S-TMSI or the I-RNTI.

Optionally, the paging-related data may further include non-$3_{rd}$ generation partnership project (3GPP) paging indication information and/or paging cause information associated with the S-TMSI or the I-RNTI. The non-3GPP paging indication information indicates whether the paging process is triggered by a non-3GPP connection. The paging cause information indicates service category information corresponding to the paging process, such as a voice, a short message, and a video.

The at least one first SIM card in the first SIM-card set receives the first signaling or the first communication information. That is to say, the first SIM card is an SIM card in the first SIM-card set that receives the first signaling and the first communication information, and the first SIM card may be all or part of terminals in the first SIM-card set. In this case, an SIM card in the second SIM-card set is in a state of not monitoring the paging process. That is to say, for the second SIM-card set, monitoring and receiving in the terminal paging process are completely processed by an SIM card in the first SIM-card set.

Optionally, the access network device may further transmit to the at least one first SIM card indication information indicative of system information update and/or indication information indicative of alarm information corresponding to the at least one second SIM card. The indication information may be transmitted through the first signaling or the first communication information, or other signaling or communication information. The system information update may be, for example, update of a master information block (MIB) and a system information block (SIB). The alarm information may be, for example, business alarm information or other information like earthquake and tsunami alarm information. Since these kinds of information are issued less frequently, it may be unnecessary to switch specially to the second SIM card to monitor the information. Instead, the first SIM card can help the second SIM card to obtain the information through cooperative paging or cooperative operation, thereby further reducing additional power consumption caused by the terminal device switching SIM cards for communication.

After the first SIM card receives the first signaling or the first communication information, the first SIM card obtains the paging-related data therein. If it is determined that the paging-related data includes paging-related data corresponding to the second SIM card, the first SIM card then transmits the corresponding paging-related data to the second SIM card. The paging-related data can be transmitted through a communication channel between the first SIM card and the second SIM card. On the other hand, since both the first SIM card and the second SIM card are in the same terminal device, the paging-related data may be transmitted via an internal interface of the terminal device.

It can be seen that in implementations of the disclosure, the paging-related data corresponding to the SIM card in the second SIM-card set is received and transmitted to the SIM card in the second SIM-card set via the SIM card in the first SIM-card set in the terminal device. Therefore, both paging-related data corresponding to the SIM card in the first SIM-card set and the paging-related data corresponding to the SIM card in the second SIM-card set are received via the SIM card in the first SIM-card set, which can reduce a switching frequency of a receiving resource of the terminal device between different SIM cards, and thus reducing power consumption of the terminal device.

In the above implementations, the first SIM card in the terminal device obtains the paging-related data corresponding to the second SIM card through the first signaling or the first communication information transmitted by the access network device. Optionally, the first SIM card may obtain the paging-related data of the second SIM card in other manners, for example, obtain the paging-related data from another terminal device. The manner in which the first SIM card obtains the paging-related data of the second SIM card is not limited herein.

Optionally, implementations of the disclosure further include the following. The terminal device determines the first SIM-card set and the second SIM-card set in a predefined manner.

Specifically, the terminal device needs to determine the first SIM-card set and the second SIM-card set, so as to determine how to receive paging-related data through cooperative paging or cooperative operation. Part or all of SIM cards in the terminal device may be determined whether to be in the first SIM-card set or the second SIM-card set in the predefined manner. Assuming that part of SIM cards in the terminal device are determined to be in the first SIM-card set or the second SIM-card set in the predefined manner, information interaction can be implemented between the remaining SIM cards in the terminal device and the part of SIM cards above through an internal interface, thereby determining whether the remaining SIM cards are in the first SIM-card set or the second SIM-card set. The predefined manner specifically includes a protocol defined manner, default setting, and the like.

The first SIM-card set and the second SIM-card set that correspond to the terminal device are determined in the predefined manner as follows.

(1) The first SIM-card set and the second SIM-card set are determined according to an RRC state. The first SIM-card set contains the SIM card that helps an SIM card in the second SIM-card set to obtain paging-related data during cooperative paging and/or cooperative operation. It can be seen from above that an RRC state of the terminal includes an RRC_IDLE state, an RRC_INACTIVE state, and an RRC_CONNECTED state. The terminal in the RRC_CONNECTED state has an RRC connection, and unicast data can be transmitted between the terminal and the access network device, so that the terminal can directly receive information from the access network device. Therefore, it can be predefined that an SIM card (corresponding to a terminal) in the RRC_CONNECTED state is an SIM card in the first SIM-card set, and an SIM card in the RRC_IDLE state or the RRC_INACTIVE state is an SIM card in the second SIM-card set.

(2) The first SIM-card set and the second SIM-card set are determined according to a logical number of an SIM card in the terminal device. The SIM card in the terminal device includes an SIM card in the first SIM-card set and/or an SIM card in the second SIM-card set. The terminal device includes multiple SIM cards, and each SIM card may correspond to a logical number, for example, correspond to SIM card 1, SIM card 2, . . . . Then it can be predefined that an SIM card corresponding to SIM card 1 is an SIM card in the first SIM-card set, and the remaining SIM cards are SIM cards in the second SIM-card set.

Alternatively, in some cases, the terminal device is provided with a primary communication SIM card and a secondary communication SIM card. For example, when a user sets SIM card 2 as a default card for making a call or providing data traffic, the SIM card 2 is set as the primary communication SIM card. Then it can be predefined that SIM card 2 is an SIM card in the first SIM-card set, and the remaining SIM cards are SIM cards in the second SIM-card set.

It needs to be noted that, assuming that the terminal device includes only the first SIM-card set and the second SIM-card set, after the first SIM-card set is determined, the remaining SIM cards in the terminal device serve as SIM cards in the second SIM-card set. Assuming that the terminal device further includes a third SIM-card set in addition to the first SIM-card set and the second SIM-card set, after the SIM card(s) in the first SIM-card set and the SIM card(s) in the second SIM-card set are determined, the remaining SIM cards in the terminal device serve as SIM cards in the third SIM-card set.

In the case where the terminal device determines the first SIM-card set and the second SIM-card set in the predefined manner, the access network device may also determine the first SIM-card set and the second SIM-card set in the terminal device in the predefined manner. The specific predefined manner is as described above, which will not be repeated herein. After the terminal device and the access network device determine the first SIM-card set and the second SIM-card set, the access network device may transmit the paging-related data of the at least one second SIM card in the second SIM-card set to the at least one first SIM card in the first SIM-card set through cooperative paging.

In this implementation of the disclosure, both the terminal device and the access network device determine the first SIM-card set and the second SIM-card set in the predefined manner, so that additional signaling overhead for configuring the first SIM-card set and the second SIM-card set are not needed between the access network device and the terminal device, thereby improving implementation efficiency in subsequent cooperative paging.

Figure 3:
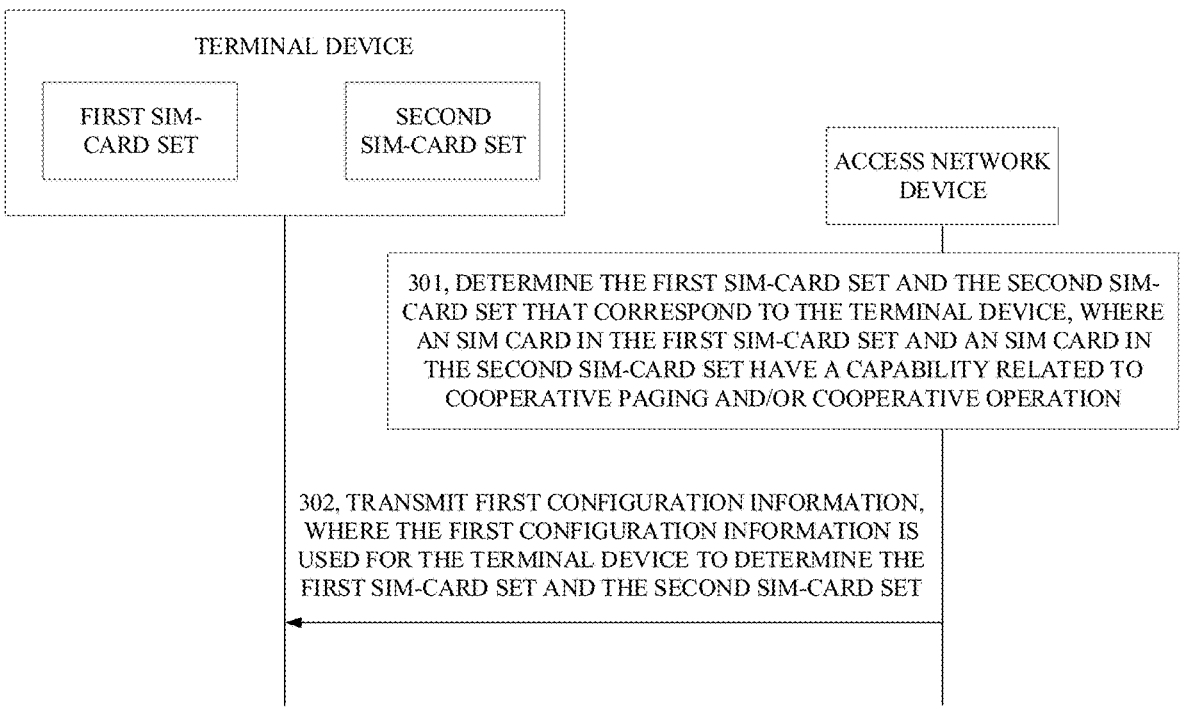
FIG. 3 is a flowchart illustrating a method for multi-card terminal device cooperative paging configuration provided in implementations of the disclosure.

Alternatively, the terminal device may determine the first SIM-card set and the second SIM-card set according to the first configuration information transmitted by the access network device. Specifically, referring to FIG. 3, FIG. 3 is a flowchart illustrating a method for multi-card terminal device cooperative paging configuration provided in implementations of the disclosure. The method specifically includes the following.

At block 301, an access network device determines a first SIM-card set and a second SIM-card set that correspond to a terminal device. At least one first SIM card in the first SIM-card set and at least one second SIM card in the second SIM-card set have a capability related to cooperative paging and/or cooperative operation.

At block 302, the access network device transmits first configuration information to the terminal device. The first configuration information is used for the terminal device to determine the first SIM-card set and the second SIM-card set.

The access network device may determine the first SIM-card set and the second SIM-card set that correspond to the terminal device in a manner other than the predefined manner described above, for example, according to information transmitted by a core network device or according to obtained capability information of the terminal device. The information transmitted by the core network device may be, for example, an identifier of an SIM card in the first SIM-card set and an identifier of an SIM card in the second SIM-card set. The capability information of the terminal device may be, for example, whether the terminal device can support multi-card terminal device cooperative paging or cooperative operation. After determining the first SIM-card set and the second SIM-card set, the access network device transmits the first configuration information to the terminal device. The first configuration information is used for the terminal device to determine the first SIM-card set and the second SIM-card set. In this case, an SIM card in the terminal device for receiving the first configuration information may be an SIM card in the first SIM-card set and/or an SIM card in the second SIM-card set, or may be all or part of SIM cards in the terminal device. An SIM card receiving no first configuration information may obtain the configuration information from another SIM card through an internal interface of the terminal device. Assuming that the terminal device further includes a third SIM-card set, an SIM card in the third SIM-card set can receive the first configuration information transmitted by the access network device, or obtain the first configuration information from another SIM card.

Since the first configuration information is used for determining the first SIM-card set and the second SIM-card set, an SIM card receiving the first configuration information may not transmit the configuration information to other SIM cards, but transmits to the other SIM cards the first SIM-card set and the second SIM-card set that have been determined according to the first configuration information. Similarly, when there is the third SIM card set, information for SIM-card set classification may also be received directly.

Optionally, the first configuration information is transmitted through a first system broadcast message or second signaling.

The system broadcast message transmitted by the access network device to the terminal device is used for transmitting to all terminal devices connected to the access network device system information related to communication connection, such as a cell identifier, a system bandwidth, cell selection information, access configuration information, common channel configuration information, dedicated channel configuration information, cell reselection-related information, and warning information. The first configuration information may be transmitted to any SIM card in the terminal device in the implementations of the disclosure through the first system broadcast message.

Alternatively, the first configuration information may be transmitted through the second signaling, for example, RRC signaling. In this way, the first configuration information can be transmitted to an SIM card in the terminal device that has an RRC connection with the network device.

The first configuration information may include at least one of: identification information corresponding to an SIM card in the first SIM-card set; an I-RNTI or a C-RNTI corresponding to an SIM card in the first SIM-card set; identification information corresponding to an SIM card in the second SIM-card set; or an I-RNTI or a C-RNTI corresponding to an SIM card in the second SIM-card set.

The identification information corresponding to an SIM card may be, for example, an SIM card number. The I-RNTI of the terminal, as described in the foregoing content, is used for uniquely identifying the terminal. The C-RNTI is a dynamic identifier allocated by the access network device to the terminal. The C-RNTI uniquely identifies a terminal device within a cell. Therefore, it is assumed that the first configuration information includes the identification information corresponding to the SIM card in the first SIM-card set or information used for uniquely identifying a terminal, such as the I-RNTI or the C-RNTI, while the SIM card correspondingly functions as an independent terminal device. After receiving the first configuration information, the SIM card in the terminal device can be determined as an SIM card in the first SIM-card set. Then the remaining SIM cards in the terminal device serve as SIM cards in the second SIM-card set. Similarly, it is assumed that the first configuration information includes the identification information corresponding to the SIM card in the second SIM-card set or information used for uniquely identifying a terminal device, such as the I-RNTI or the C-RNTI. After receiving the first configuration information, the terminal device can determine an SIM card in the second SIM-card set, and the remaining SIM cards in the terminal device serve as SIM cards in the first SIM-card set.

Assuming that the terminal device further includes a third SIM-card set, the first configuration information may include the identification information corresponding to the SIM card in the first SIM-card set or information for uniquely identifying the terminal device, such as the I-RNTI or the C-RNTI, and include the identification information corresponding to the SIM card in the second SIM-card set or information for uniquely identifying the terminal device, such as the I-RNTI or the C-RNTI, and the first configuration information is used for determining the first SIM-card set and the second SIM-card set. The remaining SIM cards in the terminal device serve as SIM cards in the third SIM-card set.

It can be seen that in this implementation of the disclosure, the access network device determines the first SIM-card set and the second SIM-card set, and then transmits the first configuration information to the terminal device, where the first configuration information is used for the terminal device to determine the first SIM-card set and the second SIM-card set, so that cooperative paging can be implemented between an SIM card in the first SIM-card set and an SIM card in the second SIM-card set. In this process, since the first SIM-card set and the second SIM-card set are determined according to the first configuration information transmitted by the access network device, the terminal can determine the same first SIM-card set and the second SIM-card set as those determined in the access network device for cooperative paging, thereby realizing behavior consistency between the access network device and the terminal device during cooperative paging.

Figure 4:
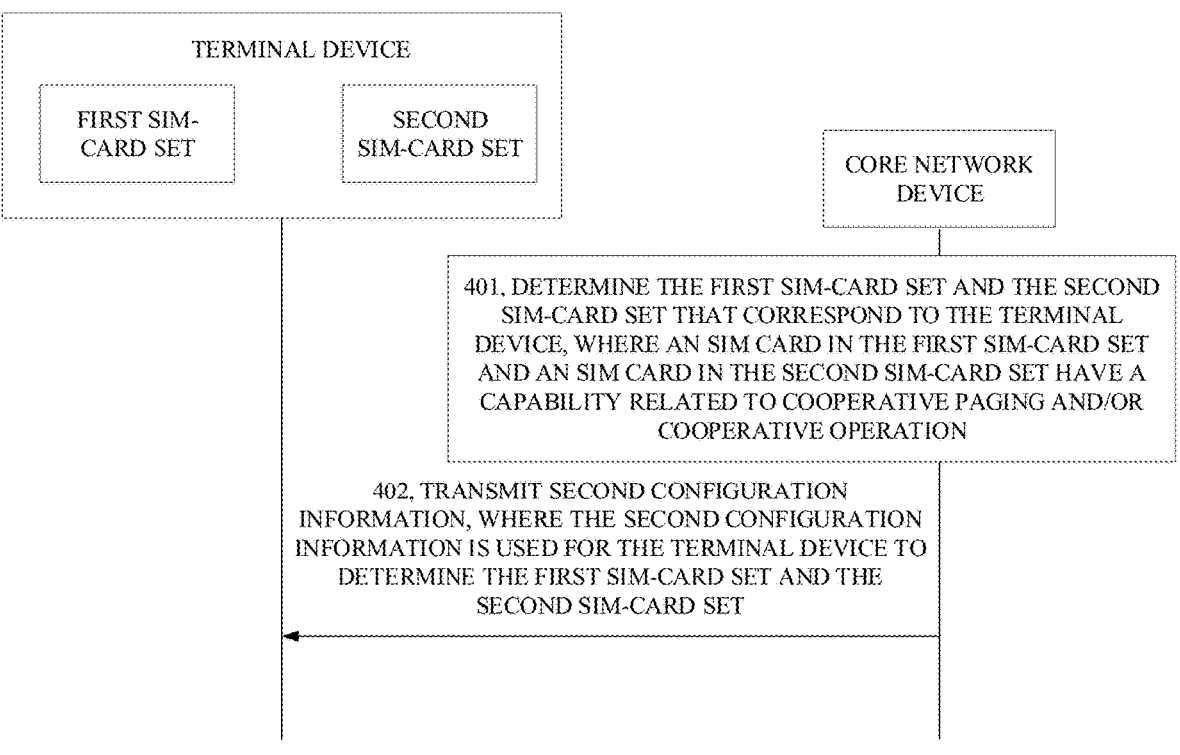
FIG. 4 is a flowchart of another method for multi-card terminal device cooperative paging configuration provided in implementations of the disclosure.

Alternatively, the terminal device may determine the first SIM-card set and the second SIM-card set according to the second configuration information transmitted by the core network device. Specifically, referring to FIG. 4, FIG. 4 is a flowchart of another method for multi-card terminal device cooperative paging configuration provided in implementations of the disclosure. The method specifically includes the following.

At block 401, a core network device determines a first SIM-card set and a second SIM-card set that correspond to a terminal device. At least one first SIM card in the first SIM-card set and at least one second SIM card in the second SIM-card set have a capability related to cooperative paging and/or cooperative operation.

At block 402, the core network device transmits second configuration information to the terminal device. The second configuration information is used for the terminal device to determine the first SIM-card set and the second SIM-card set.

The core network device may determine the first SIM-card set and the second SIM-card set that correspond to the terminal device according to, for example, information of supported capabilities transmitted by the terminal device and/or an operator local strategy. After determining the first SIM-card set and the second SIM-card set, the core network device transmits the second configuration information to the terminal device, where the second configuration information is used for the terminal device to determine the first SIM-card set and the second SIM-card set. Similarly, an SIM card in the terminal device for receiving the second configuration information may be an SIM card in the first SIM-card set and/or an SIM card in the second SIM-card set, or may be all or part of SIM cards in the terminal device. An SIM card receiving no second configuration information may obtain the second configuration information from another SIM card through an internal interface of the terminal device. Assuming that the terminal device further includes a third SIM-card set, an SIM card in the third SIM-card set can receive the second configuration information transmitted by the access network device, or obtain the second configuration information from another SIM card.

Similarly, the second configuration information is used for determining the first SIM-card set and the second SIM-card set, an SIM card receiving the second configuration information may not transmit the configuration information to other SIM cards, but transmits to the other SIM cards the first SIM-card set and the second SIM-card set that have been determined according to the second configuration information. Similarly, when there is the third SIM card set, information for set classification of the terminal may also be received directly Optionally, the core network device transmits the second configuration information to the terminal device in a non-access stratum (NAS) procedure between the terminal device and the core network device.

An NAS is a protocol layer above an RRC layer and a radio access network application part (RANAP) layer, for example, a mobile management (MM) layer and a short message service (SMS) layer. The NAS procedure is a signaling procedure processed by only the terminal device and the core network device, without a radio network controller (RNC) and a base station (Node B). Therefore, the second configuration information can be transmitted between the core network device and the terminal device in the NAS procedure.

The second configuration information includes at least one of: identification information corresponding to an SIM card in the first SIM-card set; an S-TMSI corresponding to an SIM card in the first SIM-card set; identification information corresponding to an SIM card in the second SIM-card set; or an S-TMSI corresponding to an SIM card in the second SIM-card set.

The identification information corresponding to an SIM card may be, for example, an SIM card number. The S-TMSI of the terminal, as described in the foregoing content, is used for uniquely identifying the terminal, while an SIM card in the terminal device independently implements functions of the terminal. Therefore, assuming that the second configuration information includes the identification information corresponding to the SIM card in the first SIM-card set or information used for uniquely identifying the terminal, such as the S-TMSI, after receiving the second configuration information, the terminal device can determine an SIM card in the first SIM-card set, and the remaining SIM cards in the terminal device serve as SIM cards in the second SIM-card set. Similarly, assuming that the second configuration information includes the identification information corresponding to the SIM card in the second SIM-card set or information used for uniquely identifying the terminal, such as the S-TMSI, after receiving the second configuration information, an SIM card in the terminal device can be determined as an SIM card in the second SIM-card set, and the remaining SIM cards in the terminal device serve as SIM cards in the first SIM-card set.

Assuming that the terminal device further includes a third SIM-card set, the second configuration information may include the identification information corresponding to the SIM card in the first SIM-card set or information for uniquely identifying the terminal device, such as the S-TMSI, and include the identification information corresponding to the SIM card in the second SIM-card set or information for uniquely identifying the terminal device, such as the S-TMSI, and the second configuration information is used for determining the first SIM-card set and the second SIM-card set. The remaining SIM cards in the terminal device serve as SIM cards in the third SIM-card set.

It can be seen that in this implementation of the disclosure, the core network device determines the first SIM-card set and the second SIM-card set, and then transmits the second configuration information to the terminal device, where the second configuration information is used for the terminal device to determine the first SIM-card set and the second SIM-card set, so that cooperative paging can be implemented between an SIM card in the first SIM-card set and an SIM card in the second SIM-card set. In this process, since the first SIM-card set and the second SIM-card set are determined according to the second configuration information transmitted by the core network device, the terminal can determine the same first SIM-card set and the second SIM-card set as those determined in the access network device for cooperative paging, thereby realizing behavior consistency between the core network device and the terminal device during cooperative paging.

Optionally, before the terminal receives the paging-related data corresponding to the at least one second SIM card in the second SIM-card set via the at least one first SIM card in the first SIM-card set, the method further includes the following. The terminal device determines that cooperative paging can be implemented between an SIM card in the first SIM-card set and an SIM card in the second SIM-card set.

Specifically, since the terminal device receives the paging-related data of the second SIM card via the first SIM card in a manner of cooperative paging, the terminal device may first determine whether the terminal device can implement cooperative paging. A determination manner includes the following.

(1) The terminal device receives first indication information transmitted by the access network device. The first indication information indicates whether the terminal device is allowed to perform a function of cooperative paging and/or cooperative operation. The access network device may transmit the first indication information through a second system broadcast message or third signaling. The first indication information may be received by any one or more SIM cards in the terminal device. The SIM card receiving the first indication information may forward the first indication information to other SIM cards through communication between SIM cards in the terminal device or through an internal interface of the terminal device. Alternatively, the SIM card receiving the first indication information determines, according to the first indication information, whether the SIM cards in the terminal device are allowed to perform the function of cooperative paging or cooperative operation (the function of cooperative operation includes the function of cooperative paging), and transmit a determination result to the other SIM cards in the terminal device. Upon determining that the function of cooperative paging and/or cooperative operation is allowed, the terminal device receives the paging-related data through cooperative paging.

(2) The terminal device determines whether the function of cooperative paging and/or cooperative operation is supported, according to capability information of the terminal device. The capability information of the terminal device may indicate explicitly whether the terminal device supports the function of cooperative paging and/or cooperative operation. For example, the capability information of the terminal device may perform indication through a fixed bit. Alternatively, the capability information of the terminal device may indicate implicitly whether the terminal corresponding to the SIM card in the terminal device supports the function of cooperative paging and/or cooperative operation, for example, through information such as an RRC connection mode or personal setting of the terminal corresponding to the SIM card.

(3) The terminal device receives the first indication information transmitted by the core network device. The first indication information indicates whether the terminal device is allowed to perform the function of cooperative paging and/or cooperative operation. Description of the first indication information is similar to that of the first indication information transmitted by the access network device in (1), with a difference in that the first indication information is transmitted by the core network device, and the core network device may transmit the first indication information in the NAS procedure performed by the core network device and the terminal device.

The terminal device may determine whether cooperative paging can be implemented, according to whether a single condition in the above (1) to (3) is met. For example, the terminal device may determine whether cooperative paging can be implemented, in response to reception of the first indication information transmitted by the access network device or the core network device. Alternatively, when the terminal device determines that the terminal device supports the function of cooperative paging and/or cooperative operation according to the capability information of the terminal device, it is determined that the terminal device can implement cooperative paging. Alternatively, the terminal device can determine whether cooperative paging can be implemented, according to whether multiple conditions are met. For example, the terminal device receives the first indication information from the access network device or the core network device and determines, according to the first indication information, that the terminal device is allowed to perform the function of cooperative paging and/or cooperative operation. Further, the terminal device determines, according to the capability information of the terminal device, that the terminal device supports the function of cooperative paging and/or cooperative operation. Finally, it is determined that the terminal device can implement cooperative paging.

Figure 5:
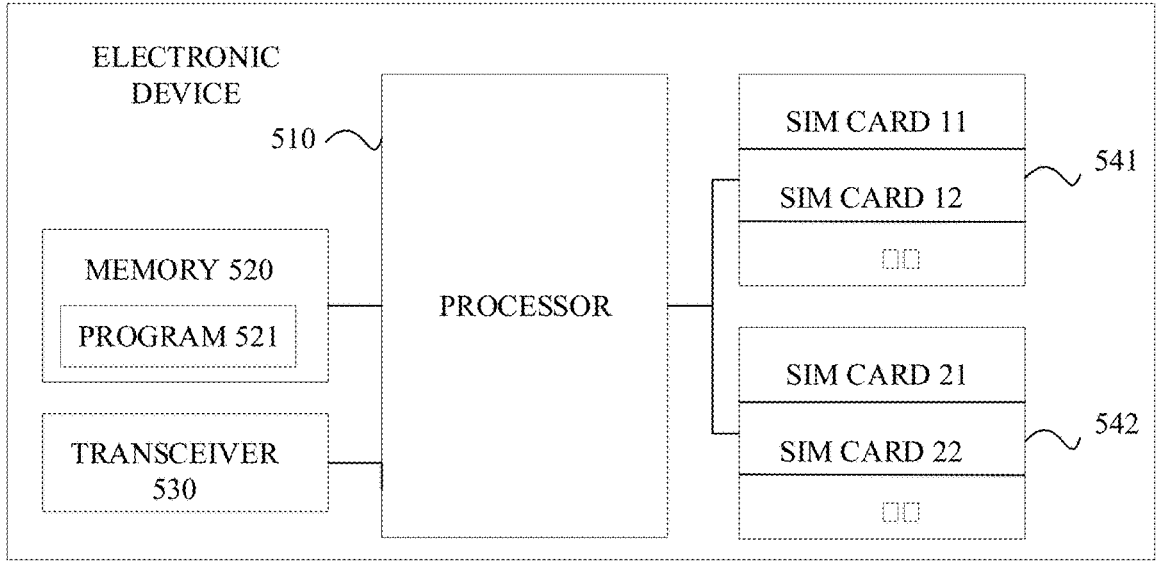
FIG. 5 is a schematic structural diagram of an electronic device provided in implementations of the disclosure.

Similar to the above implementations, referring to FIG. 5, FIG. 5 is a schematic structural diagram of an electronic device provided in implementations of the disclosure. As illustrated in FIG. 5, the electronic device includes a processor 510, a memory 520, a transceiver 530, and one or more programs 521. Furthermore, the electronic device further includes a component corresponding to a first SIM-card set 541 and a second SIM-card set 542. The component is configured to realize communication functions of multiple SIM cards in the first SIM-card set and multiple SIM cards in the second SIM-card set. The first SIM-card set 541 may include SIM card 11, SIM card 12, . . . , and the second SIM-card set 542 may include SIM card 21, SIM card 22, . . . . The one or more programs 521 are stored in the memory 520 and configured to be executed by the processor 510. The programs 521 include instructions for performing the following.

It can be seen that in implementations of the disclosure, the paging-related data corresponding to the SIM card in the second SIM-card set is received and transmitted to the SIM card in the second SIM-card set via an SIM card in the first SIM-card set in the terminal device. Therefore, both paging-related data corresponding to the SIM card in the first SIM-card set and the paging-related data corresponding to the SIM card in the second SIM-card set are received via the SIM card in the first SIM-card set, which can reduce a switching frequency of a receiving resource of the terminal device between different SIM cards, and thus reducing power consumption of the terminal device.

In a possible example, the programs include instructions for determining the first SIM-card set and the second SIM-card set in a predefined manner.

In a possible example, the programs include instructions for determining the first SIM-card set and the second SIM-card set according to configuration information.

In a possible example, determining the first SIM-card set and the second SIM-card set in the predefined manner includes determining the first SIM-card set and the second SIM-card set according to an RRC state.

In a possible example, determining the first SIM-card set and the second SIM-card set according to the RRC state includes an RRC state of an SIM card in the first SIM-card set being an RRC_CONNECTED, and an RRC state of an SIM card in the second SIM-card set being an RRC_IDLE or an RRC_INACTIVE.

In a possible example, determining the first SIM-card set and the second SIM-card set in the predefined manner includes determining the first SIM-card set and the second SIM-card set according to a logical number of an SIM card in the terminal device. The SIM card in the terminal device includes an SIM card in the first SIM-card set and/or an SIM card in the second SIM-card set.

In a possible example, determining the first SIM-card set and the second SIM-card set according to the configuration information includes determining the first SIM-card set and the second SIM-card set according to first configuration information obtained from an access network device, or determining the first SIM-card set and the second SIM-card set according to second configuration information obtained from a core network device.

In a possible example, the first configuration information obtained from the access network device is obtained through a first system broadcast message or second signaling transmitted by the access network device.

In a possible example, the first configuration information includes at least one of: identification information corresponding to an SIM card in the first SIM-card set; an I-RNTI or a C-RNTI corresponding to an SIM card in the first SIM-card set; identification information corresponding to an SIM card in the second SIM-card set; or an I-RNTI or a C-RNTI corresponding to an SIM card in the second SIM-card set.

In a possible example, the second configuration information obtained from the core network device is obtained in an NAS procedure performed by the terminal device and the core network device, and transmitted the second configuration information to an AS of the terminal device.

In a possible example, the second configuration information includes at least one of: identification information corresponding to an SIM card in the first SIM-card set; an S-TMSI corresponding to an SIM card in the first SIM-card set; identification information corresponding to an SIM card in the second SIM-card set; or an S-TMSI corresponding to an SIM card in the second SIM-card set.

In a possible example, the paging-related data includes an S-TMSI allocated by a core network device or an I-RNTI allocated by an access network device.

In a possible example, the paging-related data further includes non-3GPP paging indication information and/or paging cause information associated with the S-TMSI or the I-RNTI.

In a possible example, the programs 521 include instructions for performing the following. The terminal device receives first indication information transmitted by an access network device or a core network device. The first indication information indicates whether the terminal device is allowed to perform a function of cooperative paging and/or cooperative operation. And/or, the terminal device determines whether the function of cooperative paging and/or cooperative operation is supported, according to capability information of the terminal device.

In a possible example, the first indication information is transmitted through a second system broadcast message or third signaling on condition that the first indication information is transmitted by the access network device. Alternatively, the first indication information is transmitted in an NAS procedure performed by the core network device and the terminal device on condition that the first indication information is transmitted by the core network device.

In a possible example, the programs 521 include instructions for performing the following. The at least one first SIM-card obtains indication information indicative of system information update and/or indication information indicative of alarm information for the at least one second SIM-card, and transmits the indication information indicative of system information update and/or the indication information indicative of alarm information to the at least one second SIM-card.

Figure 2B:
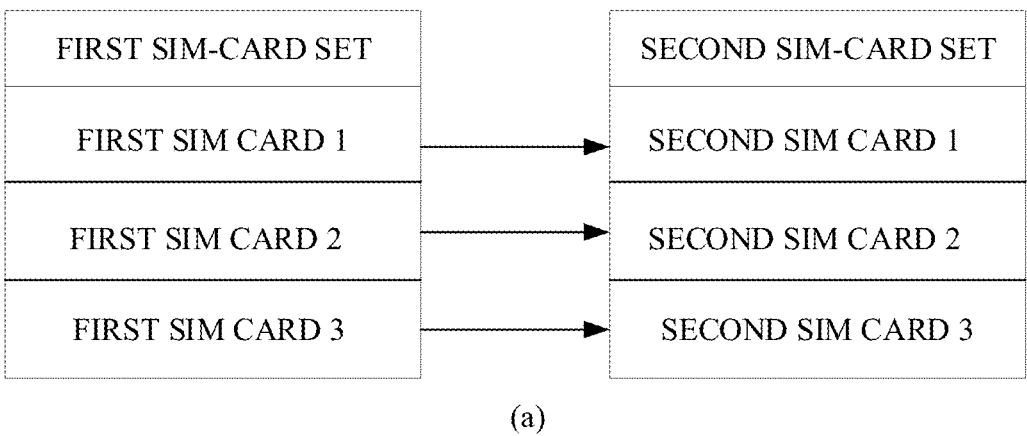
FIG. 2B is a schematic diagram of a correspondence between first subscriber identity module (SIM) cards and second SIM cards during cooperative paging provided in implementations of the disclosure.
Figure 2B:
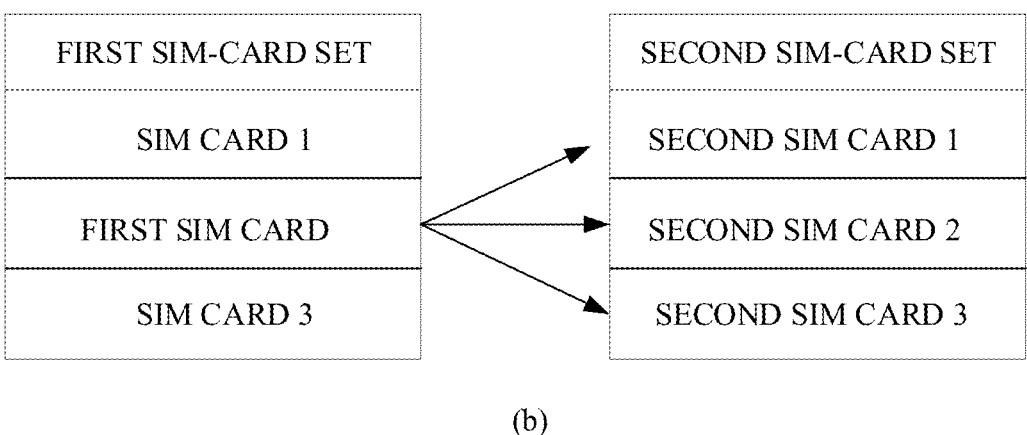
Figure 2B:
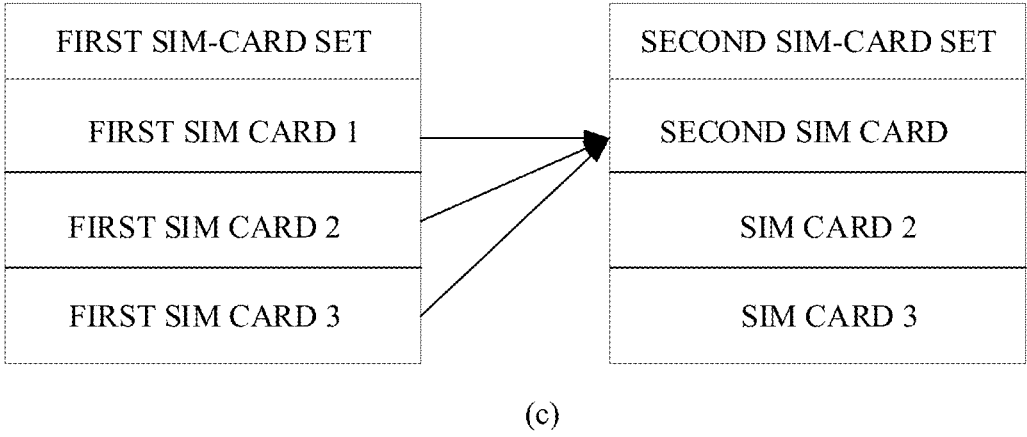

Specific description of execution of the above operations by the programs can refer to the related description for the terminal device in the method implementations in FIGS. 2A to 2B, which will not be repeated herein.

Figure 6:
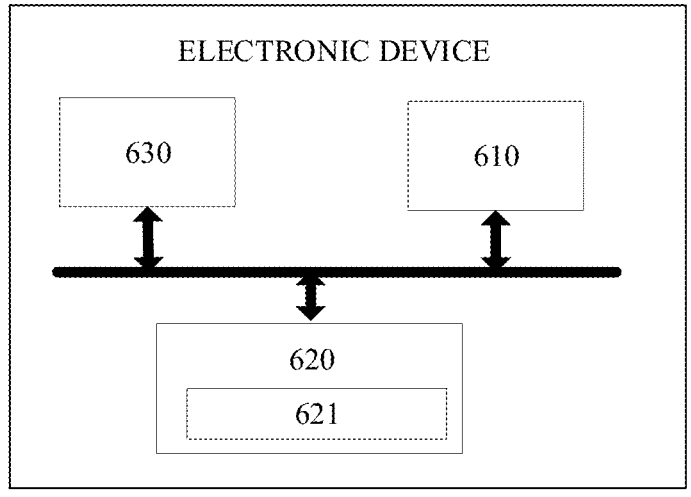
FIG. 6 is a schematic structural diagram of another electronic device provided in implementations of the disclosure.

Alternatively, referring to FIG. 6, FIG. 6 is a schematic structural diagram of another electronic device provided in implementations of the disclosure. As illustrated in FIG. 6, the electronic device includes a processor 610, a memory 620, a transceiver 630, and one or more programs 621. The programs 621 include instructions for: determining a first SIM-card set and a second SIM-card set that correspond to a terminal device, where at least one first SIM-card in the first SIM-card set and at least one second SIM-card in the second SIM-card set have a capability related to cooperative paging and/or cooperative operation; and transmitting first signaling or first communication information to the at least one first SIM-card in the first SIM-card set, where the first signaling or the first communication information includes paging-related data corresponding to the at least one second SIM-card in the second SIM-card set.

In a possible example, the first SIM-card set and the second SIM-card set are determined in a predefined manner.

In a possible example, determining the first SIM-card set and the second SIM-card set in the predefined manner includes determining the first SIM-card set and the second SIM-card set according to a RRC state.

In a possible example, determining the first SIM-card set and the second SIM-card set according to the RRC state, wherein an RRC state of an SIM card in the first SIM-card set being an RRC_CONNECTED, and an RRC state of an SIM card in the second SIM-card set being an RRC_IDLE or an RRC_INACTIVE.

In a possible example, determining the first SIM-card set and the second SIM-card set in the predefined manner includes determining the first SIM-card set and the second SIM-card set according to a logical number of an SIM card in the terminal device. The SIM card in the terminal device includes an SIM card in the first SIM-card set and/or an SIM card in the second SIM-card set.

In a possible example, the programs 621 include instructions for transmitting first configuration information to the terminal device. The first configuration information is used for the terminal device to determine the first SIM-card set and the second SIM-card set. The terminal device includes an SIM card in the first SIM-card set and an SIM card in the second SIM-card set.

In a possible example, a first system broadcast message or second signaling is transmitted to the terminal device, where the first system broadcast message or the second signaling includes the first configuration information.

In a possible example, the first configuration information includes at least one of: identification information corresponding to an SIM card in the first SIM-card set; an I-RNTI or a C-RNTI corresponding to an SIM card in the first SIM-card set; identification information corresponding to an SIM card in the second SIM-card set; or an I-RNTI or a C-RNTI corresponding to an SIM card in the second SIM-card set.

In a possible example, the paging-related data includes an I-RNTI allocated by the access network device or an S-TMSI allocated by a core network device.

In a possible example, the paging-related data further includes non-3GPP paging indication information and/or paging cause information associated with the S-TMSI or the I-RNTI.

In a possible example, the programs 621 include instructions for transmitting first indication information to the terminal device. The first indication information indicates whether the terminal device is allowed to perform a function of cooperative paging and/or cooperative operation.

In a possible example, the programs 621 include instructions for determining whether the terminal device supports the function of cooperative paging and/or cooperative operation, according to capability information obtained of the terminal device.

In a possible example, the first indication information is transmitted through a second system broadcast message or third signaling.

In a possible example, before transmitting the first signaling or the first communication information to the at least one first SIM-card in the first SIM-card set, the programs 621 include instructions for obtaining the paging-related data from a core network device, or generating the paging-related data.

In a possible example, the programs 621 include instructions for transmitting indication information indicative of system information update and/or indication information indicative of alarm information for the at least one second SIM-card to the at least one first SIM-card.

Alternatively, the programs 621 include instructions for: determining a first SIM-card set and a second SIM-card set that correspond to a terminal device, where at least one first SIM-card in the first SIM-card set and at least one second SIM-card in the second SIM-card set have a capability related to cooperative paging and/or cooperative operation; transmitting second configuration information to the terminal device, where the second configuration information is used for the terminal device to determine the first SIM-card set and the second SIM-card set.

In a possible example, the second configuration information includes at least one of: identification information corresponding to an SIM card in the first SIM-card set; an S-TMSI corresponding to an SIM card in the first SIM-card set; identification information corresponding to an SIM card in the second SIM-card set; or an S-TMSI corresponding to an SIM card in the second SIM-card set.

In a possible example, transmitting, by the core network device, the second configuration information to the terminal device includes transmitting the second configuration information to the terminal device in an NAS procedure performed by the terminal device and the core network device.

In a possible example, the programs 621 include instructions for transmitting first indication information to the terminal device. The first indication information indicates whether the terminal device is allowed to perform a function of cooperative paging and/or cooperative operation.

In a possible example, transmitting the first indication information to the terminal device includes transmitting, by the core network device, the first indication information in an NAS procedure performed by the terminal device and the core network device.

In a possible example, before transmitting the first indication information to the terminal device, the programs 621 include instructions for performing the following. The core network device determines whether the terminal device supports the function of cooperative paging and/or cooperative operation, according to capability information obtained of the terminal device. And/or, the core network device determines whether the terminal device is allowed to perform the function of cooperative paging and/or cooperative operation, according to an operator strategy of the core network device.

The foregoing solution of the implementations of the disclosure is mainly described from the viewpoint of interaction process of various network elements. It can be understood that, in order to implement the above functions, the terminal and the network device include hardware structures and/or software modules for performing the respective functions. Those skilled in the art should readily recognize that, in combination with the units and algorithmic operations of various examples described in the implementations disclosed herein, the present disclosure can be implemented in hardware or a combination of the hardware and computer software. Whether a function is implemented by way of the hardware or hardware driven by the computer software depends on the particular application and design constraints of the technical solution. Those skilled in the art may use different methods to implement the described functions for each particular application, but such implementation should not be considered as beyond the scope of the present disclosure.

According to the implementations of the disclosure, functional units may be divided for the terminal in accordance with the foregoing method examples. For example, each functional unit may be divided according to each function, and two or more functions may be integrated in one processing unit. The above-mentioned integrated unit can be implemented in the form of hardware or software program modules. It should be noted that the division of units in the implementations of the present disclosure is schematic, and is merely a logical function division, and there may be other division manners in actual implementation.

Figure 7:
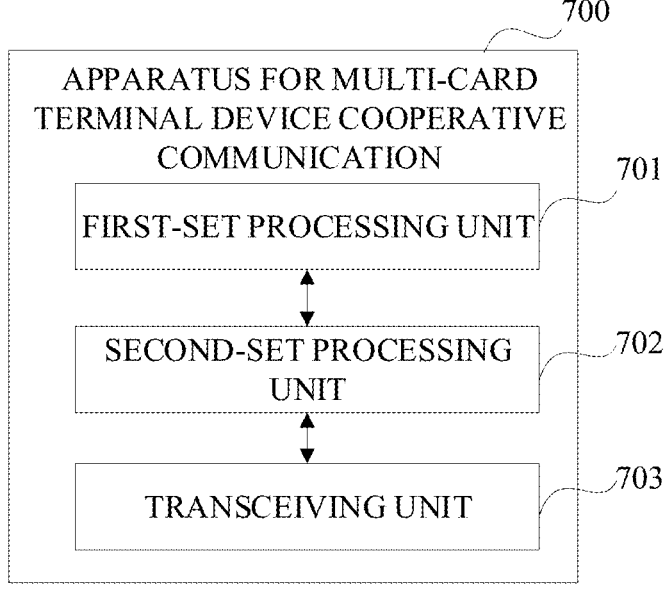
FIG. 7 is a block diagram of functional units of an apparatus for multi-card terminal device cooperative communication provided in implementations of the disclosure.

In the case of the integrated unit, FIG. 7 illustrates a block diagram of functional units of the apparatus involved in the foregoing implementations. An apparatus 700 for multi-card terminal device cooperative communication includes a first-set processing unit 701 and a second-set processing unit 702. The first-set processing unit 701 is configured to control an action of an SIM card in a first SIM-card set in the apparatus for multi-card terminal device cooperative communication. For example, the first-set processing unit 701 is configured to support the apparatus for multi-card terminal device cooperative communication to perform the operations at 201 and 202 in FIG. 2A, and support other processes of the technology described herein. The second-set processing unit 702 is configured to control an action of an SIM card in a second SIM-card set in the apparatus for multi-card terminal device cooperative communication. For example, the second-set processing unit 702 is configured to support the apparatus for multi-card terminal device cooperative communication to perform the operation at 202 in FIG. 2A. That is, the second-set processing unit 702 is configured to receive the paging-related data transmitted by the first SIM card in the first SIM-card set in the operation at 202, and perform subsequent processing according to the paging-related data. The apparatus 700 for multi-card terminal device cooperative communication may further include a transceiving unit 703. The transceiving unit 703 is configured to support communication between the apparatus and other devices, for example, communication between the first-set processing unit 701 and the access network device at 202 can be achieved in conjunction with the transceiving unit 703. The apparatus 700 for multi-card terminal device cooperative communication may further include a storage unit (not illustrated in figures) configured to store program codes and data of the network device.

The first-set processing unit 701 and the second-set processing unit 702 may be physically independent units or logically independent units in function, which may specifically be a processor or a controller. The transceiving unit 703 may be a transceiver, a transceiving circuit, a radio frequency chip, or the like. The storage unit may be a memory.

It needs to be noted that, when the apparatus 700 for multi-card terminal device cooperative communication is configured to perform other methods in the method implementations corresponding to FIG. 2A and FIG. 2B, the actions performed or the methods implemented by the terminal device or the terminal in the terminal device may be implemented by any one of the first-set processing unit 701 and the second-set processing unit 702, or may be implemented by the two units together. Alternatively, the apparatus 700 for multi-card terminal device cooperative communication may further include other processing units configured to perform the actions performed by the terminal device or the terminal in the terminal device or implement the corresponding method, which will not be limited herein.

When the first-set processing unit 701 and the second-set processing unit 702 are processors, the transceiving unit 703 is a communication interface, and the storage unit is a memory, the network device involved in implementations of the disclosure may be the electronic device illustrated in FIG. 5.

Figure 8:
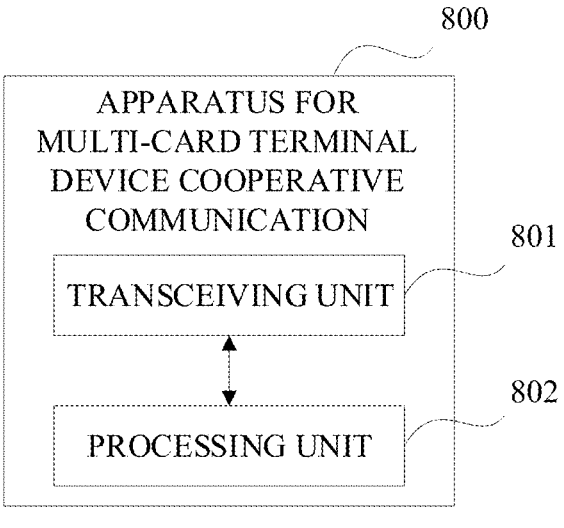
FIG. 8 is a block diagram of functional units of an apparatus for multi-card terminal device cooperative communication provided in implementations of the disclosure.

In the case of the integrated unit, FIG. 8 illustrates a block diagram of functional units of the other apparatus involved in the foregoing implementations. An apparatus 800 for multi-card terminal device cooperative communication includes a processing unit 802 and a transceiving unit 801. The processing unit 802 is configured to control an action of the apparatus for multi-card terminal device cooperative communication. For example, the processing unit 802 is configured to support the apparatus for multi-card terminal device cooperative communication to perform the operations at 301 and 302 in FIG. 3, and/or support other processes of the technology described herein. The transceiving unit 801 is configured to support communication between the apparatus for multi-card terminal device cooperative communication and other devices. The apparatus 800 for multi-card terminal device cooperative communication may further include a storage unit (not illustrated in figures) configured to store program codes and data of the terminal.

Alternatively, the processing unit 802 is configured to support the apparatus for multi-card terminal device cooperative communication to perform the operations at 401 and 402 in FIG. 4, and/or support other processes of the technology described herein. The transceiving unit 801 is configured to support communication between the apparatus for multi-card terminal device cooperative communication and other devices.

The processing unit 502 can be a processor or a controller, for example, a central processing unit (CPU), a general-purpose processor, a digital signal processor (DSP), an application specific integrated circuit (ASIC), a field programmable gate array (FPGA), other programmable logic devices, transistor logic devices, hardware components, or any combination thereof. Various exemplary logical blocks, units, and circuits described in conjunction with the disclosure may be achieved or implemented. The processor also may be a combination realizing computing functions, for example, a combination of one or more microprocessors, a combination of the DSP and the microprocessor, or the like. The transceiving unit 801 may be a transceiver, a transceiving circuit, etc. The storage unit may be a memory.

When the processing unit 802 is a processor, the transceiving unit 801 is a communication interface, and the storage unit is a memory, the apparatus 800 for multi-card terminal device cooperative communication involved in implementations of the disclosure may be the electronic device illustrated in FIG. 6.

A computer-readable storage medium is further provided in implementations of the disclosure. The computer-readable storage medium stores a computer program for electronic data interchange. The computer program enables a computer to perform part or all of the operations performed by the receiving end in the foregoing method implementations.

A computer program product is further provided in implementations of the disclosure. The computer program product includes a non-transitory computer-readable storage medium that stores computer programs. The computer programs are operable with a computer to perform part or all of the operations performed by the receiving end in the foregoing methods. The computer program product may be a software installation package.

The algorithmic operations and the method illustrated in implementations may be implemented as hardware, or may be implemented by a processor performing software instructions. The software instructions may be composed with corresponding software modules. The software module can be stored in a storage medium such as a random access memory (RAM), a flash memory, a read only memory (ROM), an erasable programmable read-only memory (EPROM), an electrically erasable programmable read-only memory (EEPROM), a register, a hard disc, a mobile hard disc, or a compact disc read-only memory (CD-ROM), or in storage media with any other forms known in this field. An exemplary storage medium is coupled to the processor, so that the processor can read information from the storage medium and can write information to the storage medium. Of course, the storage medium can also be a part of the processor. The processor and the storage medium may be located in an ASIC. In addition, the ASIC may be located in an access network device, a target network device, or a core network device. Of course, the processor and the storage medium may also be presented as discrete components in the access network device, the target network device, or the core network device.

Those skilled in the art can appreciate that, in the above-mentioned one or more implementations, all or part of the illustrated functions can be implemented through software, hardware, firmware, or any other combination thereof. When implemented by software, all or part of the above implementations can be implemented in the form of a computer program product. The computer program product includes one or more computer instructions. When the computer instructions are loaded and executed on a computer, all or part of the processes or functions of the implementations of the disclosure are performed. The computer can be a general-purpose computer, a special-purpose computer, a computer network, or other programmable apparatuses. The computer instructions can be stored in a computer-readable storage medium, or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fiber, a digital subscriber line (DSL), etc. The wireless manner can be, for example, infrared, wireless, microwave, etc. The computer-readable storage medium can be any computer-accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

The above-mentioned implementations provide further details of the purpose, technical solutions and beneficial effects of the implementations of this disclosure. It can be understood that, the above is only specification implementation manners of the implementations of the disclosure and is not intended to limit the scope of protection of the implementations of the disclosure. Any modification, equivalent arrangements and improvement made on the basis of the technical solution of the implementations of the disclosure shall be included in the scope of protection of the implementations of the disclosure.

What is claimed is:

1. A method for multiple-card (multi-card) terminal device communication, performed by a terminal device, the terminal device comprising a first subscriber identity module (SIM)-card set and a second SIM-card set, at least one first SIM-card in the first SIM-card set and at least one second SIM-card in the second SIM-card set having a capability related to cooperative paging and/or cooperative operation, the method comprising:

transmitting, by the at least one first SIM-card in the first SIM-card set to the at least one second SIM-card in the second SIM-card set, paging-related data corresponding to the at least one second SIM-card in the second SIM-card set in response to reception of the paging-related data;

wherein the method further comprises:

receiving, by the terminal device, first indication information transmitted by an access network device or a core network device, wherein the first indication information indicates whether the terminal device is allowed to perform a function of cooperative paging and/or cooperative operation; and/or determining, by the terminal device, whether the function of cooperative paging and/or cooperative operation is supported, according to capability information of the terminal device.

2. The method of claim 1, further comprising: determining the first SIM-card set and the second SIM-card set according to configuration information received.

3. The method of claim 2, wherein the configuration information comprises at least one of:

first configuration information obtained from the access network device; or second configuration information obtained from the core network device.

4. The method of claim 3, wherein the first configuration information comprises at least one of:

identification information corresponding to an SIM card in the first SIM-card set;

an inactive-radio network temporary identifier (I-RNTI) or a cell-radio network temporary identifier (C-RNTI) corresponding to an SIM card in the first SIM-card set;

identification information corresponding to an SIM card in the second SIM-card set; or an I-RNTI or a C-RNTI corresponding to an SIM card in the second SIM-card set.

5. The method of claim 3, wherein the second configuration information comprises at least one of:

identification information corresponding to an SIM card in the first SIM-card set;

a service-temporary mobile subscriber identifier (S-TMSI) corresponding to an SIM card in the first SIM-card set;

identification information corresponding to an SIM card in the second SIM-card set; or an S-TMSI corresponding to an SIM card in the second SIM-card set.

6. The method of claim 1, wherein the paging-related data comprises:

an S-TMSI allocated by the core network device; or an I-RNTI allocated by the access network device.

7. The method of claim 6, wherein the paging-related data further comprises at least one of:

non-$3^{rd}$ generation partnership project (3GPP) paging indication information; or paging cause information associated with the S-TMSI or the I-RNTI.

8. The method of claim 1, further comprising:

receiving, by the at least one first SIM-card in the first SIM-card set, indication information indicative of system information update and/or indication information indicative of alarm information for the at least one second SIM-card in the second SIM-card set, and transmitting, by the at least one first SIM-card in the first SIM-card set, the indication information indicative of system information update and/or the indication information indicative of alarm information to the at least one second SIM-card in the second SIM-card set.

9. An electronic device, comprising:

a processor, a memory, a transceiver, and one or more programs stored in the memory;

wherein when the one or more programs are executed by the processor, the electronic device is caused to perform the method of claim 1.

10. A method for multiple-card (multi-card) terminal device cooperative communication, comprising:

determining, by an access network device, a first subscriber identity module (SIM)-card set and a second SIM-card set that correspond to a terminal device, at least one first SIM-card in the first SIM-card set and at least one second SIM-card in the second SIM-card set having a capability related to cooperative paging and/or cooperative operation; and transmitting, by the access network device, first signaling or first communication information to the at least one first SIM-card in the first SIM-card set, the first signaling or the first communication information comprising paging-related data corresponding to the at least one second SIM-card in the second SIM-card set;

wherein the method further comprises:

transmitting, by the access network device, first indication information to the terminal device, wherein the first indication information indicates whether the terminal device is allowed to perform a function of cooperative paging and/or cooperative operation.

11. The method of claim 10, further comprising:

transmitting, by the access network device, first configuration information to the terminal device, wherein the first configuration information is used for the terminal device to determine the first SIM-card set and the second SIM-card set.

12. The method of claim 11, wherein the first configuration information comprises at least one of:

identification information corresponding to an SIM card in the first SIM-card set;

an inactive-radio network temporary identifier (I-RNTI) or a cell-radio network temporary identifier (C-RNTI) corresponding to an SIM card in the first SIM-card set;

identification information corresponding to an SIM card in the second SIM-card set; or an I-RNTI or a C-RNTI corresponding to an SIM card in the second SIM-card set.

13. The method of claim 10, wherein the paging-related data comprises:

an I-RNTI allocated by the access network device; or a service-temporary mobile subscriber identifier (S-TMSI) allocated by a core network device.

14. The method of claim 13, wherein the paging-related data further comprises at least one of:

non-3$^{rd}$ generation partnership project (3GPP) paging indication information; or paging cause information associated with the S-TMSI or the I-RNTI.

15. The method of claim 10, further comprising:

transmitting, by the access network device, indication information indicative of system information update and/or indication information indicative of alarm information for the at least one second SIM-card in the second SIM-card set to the at least one first SIM-card in the first SIM-card set.

16. An access network device, comprising:

a processor, a memory, a transceiver, and one or more programs stored in the memory;

wherein when the one or more programs are executed by the processor, the access network device is caused to perform the method of claim 10.

* * * * *